Feb. 17, 1953  J. C. KASS ET AL  2,628,798
CHRISTMAS TREE STAND
Filed Sept. 1, 1949
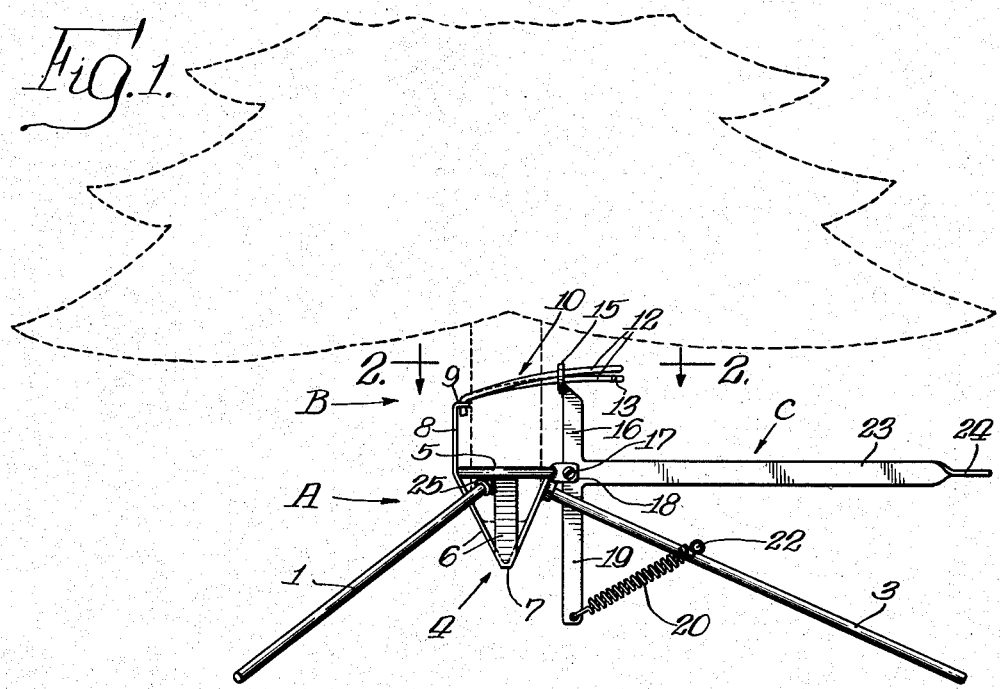
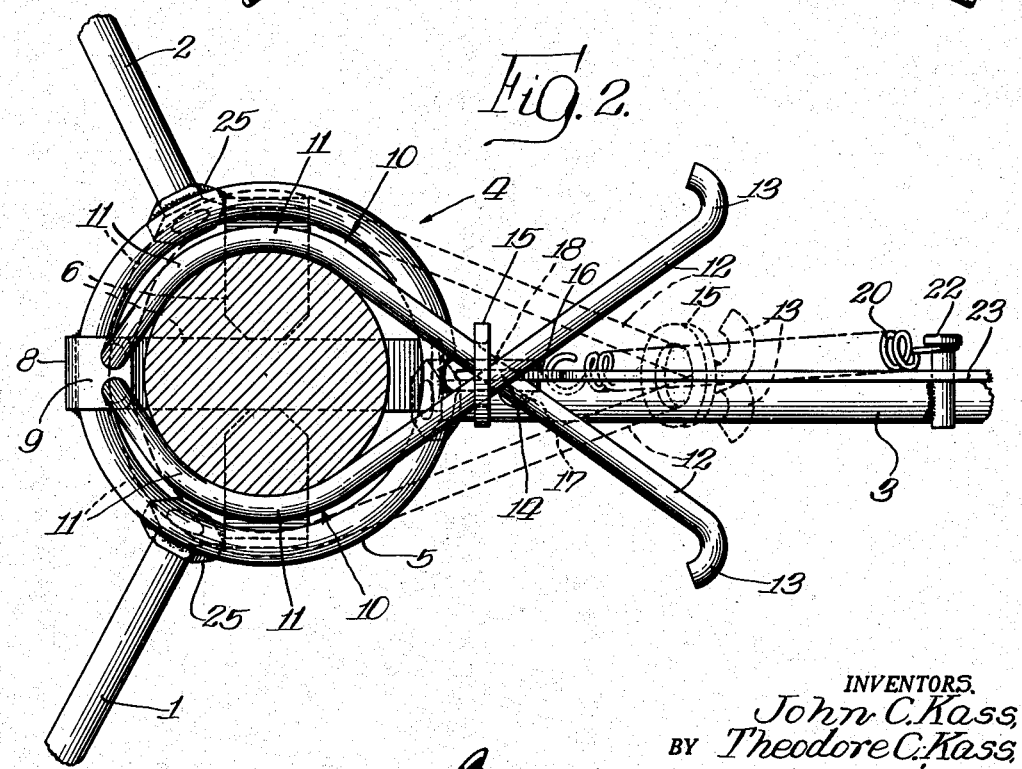
INVENTORS.
John C. Kass,
Theodore C. Kass,
BY Patented Feb. 17, 1953

2,628,798

UNITED STATES PATENT OFFICE 2,628,798

CHRISTMAS TREE STAND

John C. Kass and Theodore C. Kass,
Ravenna, Mich.

Application September 1, 1949, Serial No. 113,514

10 Claims. (Cl. 248—44)

Our invention relates to Christmas tree stands and the like.

We have studied various forms of metal tree stands now on the market, and observed that they are inconvenient to apply, and it is difficult for one person working alone to get the tree straight in the stand.

The usual procedure is to lay the tree on its side, and then apply the stand to the base or stem of the tree and tighten up whatever clamping or fastening means are provided. Then the tree is turned upright on the stand, and the usual result is that the tree stands crooked. The way to overcome this is to call a second person to hold the tree straight while the operator gets down on the floor and loosens and reapplies the clamping or fastening means under the directions of the assistant who holds the tree straight.

We conceived the idea of providing clamping means which the operator could actuate or control standing up alongside the tree, so that he could see that the tree was straight and plumb in the stand, and then, without leaving that position, he could actuate or cause actuation of the clamping means on the stand.

We further conceived that this required a clamping means that was substantially self-centering for different sizes of tree stems, in other words, a substantially self-centering chuck adapted to take various sizes of tree stems. This self-centering chuck needed to be operable or controllable by the foot of the operator standing up alongside the tree, so that he could hold the tree upright in the stand and then, with some simple movement of his foot cause application of the chuck to the tree stem.

The practical problem then was to devise a mechanism which would embody the above inventive concept and perform the above novel function, and yet be cheap enough to be competitive.

We conceived the idea of providing a stand having an open conical socket for centering and holding the end of the stem with a plurality of chuck jaws, at least two in number, mounted on the stand and arranged to grip the stem a short distance above the socket and to be actuable or controllable by a pedal lever pivoted on the stand.

In carrying this idea into practice, we adopted the idea of using a pair of pivoted chuck jaws with connected convergent arms held by a shackle which embraced the arms preferably at about their point of crossing. By sliding this shackle along the arms, we would either close or open the chuck jaws according to the direction of movement of the shackle.

The shackle is made self-locking relative to the arms by employing a spring to move the shackle along the arms to close the chuck jaws. If the angle that the arms make with the shackle be made smaller than the angle whose tangent is equal to the coefficient of friction of the engaging parts, the jaws become completely self-locking without a follower spring. This, however, tends to limit the amount of opening and closing motion too greatly.

By mounting the shackle on an upwardly extending lever arm pivoted on the stand, the shackle will be able to actuate the chuck jaws and also steady them vertically and laterally. This arm may be actuated in various ways. We prefer to employ a spring which acts on the shackle in a direction to clamp the jaws and acts to hold the shackle against being moved toward the release position by force applied to the jaws and to use a pedal to move the chuck jaws to the release position. When the pedal is depressed, the stem of the tree may be inserted between the jaws. The base of the stem is centered in the socket and the tree is then held straight by the hands of the operator. Then the operator releases the pedal lever and the spring closes the chuck jaws and locks the jaws in position. The release of the tree is accomplished by simply stepping on the pedal.

We believe it is broadly new to provide a tree stand which can be applied to the stem of the tree by the operator standing alongside the tree where he can judge whether the tree is plumb in the stand. Obviously, if he is not satisfied with the first application, he can conveniently release the chuck and shift the position of the tree. The action of the chuck is flexible enough in its application to the stem that it can be locked a little more to one side or another in any lateral direction if that is found desirable, as where the tree is not straight or the stem is not symmetrical.

The specific embodiment herein described and illustrated is but one exemplification of our invention. Numerous embodiments of our invention differing in form and details will at once occur to those skilled in the art. The true scope of the invention is ascertainable from the claims appended to this specification.

Now in order to acquaint those skilled in the art with the manner of constructing and operating a device embodying our invention, we shall describe, in connection with the accompanying drawings, the preferred embodiment of the same.

In the drawings:

Figure 1 is a side elevation of the stand with the tree indicated in dotted lines;

Figure 2 is a top plan view on a larger scale taken on the line 2—2 of Figure 1 showing the jaw members closed in full lines and open in dotted lines.

The device illustrated comprises three main parts, namely, the stand and cup A, the chuck mechanism B and the chuck operating or opening and closing mechanism C.

In the specific embodiment shown, the stand A comprises three legs 1, 2 and 3, disposed at equal angles to each other, and attached at their inner convergent ends to the conical socket member 4. Four or more legs or other floor engaging means may be used if desired. The socket member in the particular form illustrated comprises a ring or band 5 with a series of straps 6 welded to the ring and converging to a vertex 7 where they are joined together as by welding. While welding of these parts is a simple method of manufacture, it is to be understood that the method of making up the parts, whether by welding, casting, stamping or otherwise, is not of significance in respect of the main inventive concept. The stand thus far described consists merely of an extended base for supporting the tapered socket 4 in a suitably elevated position. The socket 4 is adapted to receive the lower end of the stem of a Christmas tree, and to center the same in respect of the stand and the chuck later to be described. A conical water container may be disposed in the socket to supply the tree with moisture, but this is an added refinement which may or may not be employed. As shown, the socket 4 is not a continuous cone. This is sometimes of advantage in that there may be irregularities in the contour of the base which are more easily accommodated by an open-work socket than by a continuous socket.

The self-centering chuck B is mounted on the base A in such manner as to grip the stem of the tree above the socket 4 thereby holding the stem at a minimum of two spaced points and providing a steady support. One of the straps 6 is continued upwardly to form a bracket 8 extending up alongside the ring 5 and having its upper end bent into substantial horizontal position to form a shelf. A pair of chuck members consisting in this case of pieces of round rod iron have curved jaw portions 11, 11 facing each other. These rods have their inner ends bent downwardly and inserted in holes in the bracket shelf 9 to form a loose pivotal connection of each of the rods with the shelf of the supporting bracket. The outer ends of the members 10, 10 are made in the form of straight or substantially straight extensions 12, 12 terminating in stops 13, 13. The straight portions 12, 12 are substantially tangent to the curved jaw portions 11, 11, and these straight portions converge towards each other and cross each other at the point 14, where they are embraced by the shackle eye 15 carried on the lever arm 16. The lever arm 16 is pivoted on a horizontal pivot 17, carried by the ears 18, 18, welded to the ring 5 of the stand. The eye 15 which forms a shackle for the straight portions 12 of the jaw members 10, 10 is swung in a vertical plane which is diametrical of the socket 4 and in line with the bracket 8, and hence substantially in line with the pivot points of the said members 10, 10 in the bracket shelf 9. The arm 16 is preferably made of flat bar stock swinging edgewise in the aforesaid plane between the ears 18, 18. As the arm 16 is swung outwardly away from the pivot points of the members 10, 10, the shackle is stripped along the straight portions 12, 12 of the rods and thereby the jaw portions 11, 11 are spread apart. The stop portions 13, 13 which are merely the bent ends of the rod portions 12, 12 prevent the shackle from leaving contact with the rods. The angle which the rods make with the shackle is so low that the shackle with the help of the spring 20 locks the rods in position. In other words, a limited force supplied to the jaws to spread the rods is ineffective to do so because the angle is too low to allow the shackle to be moved against the spring 20. Hence, the shackle locks the rods in any position of the jaws to grip an object between them.

Preferably the rods have a slight curvature substantially parallel to the arc which the outer end of the arm 16 describes in moving the shackle on the radius of said arm. In other words, the straight portions of the rod may be so disposed with respect to the pivot 17 that swinging of the arm 16 does not substantially raise or lower the jaws because of the curvature of the path of the shackle 15.

The actuating and release mechanism C in the device shown comprises the two arms 19 and 23 rigid with the arm 16 for movement about the pivot 17. The arm 19 is formed as a continuation of the arm 16 past the pivot 17, and it is connected through the spring 20 with a spring anchor pin 22 attached to the leg 3. The spring 20 is a tension spring which tends to turn the lever system, namely, the arms 16, 19 and 23, about the pivot 17 in the counter clockwise direction as viewed in Figure 1.

The arm 16, when thus moved counter clockwise by the spring 20, slides the shackle 15 along the rod portions 12, 12 to close the jaw portions 11, 11 towards each other. The pedal lever 23 which extends in a generally horizontal direction is connected to the arms 16 and 19 adjacent the pivot 17, and the outer end of the said lever 23 is twisted to form a flat pedal 24.

The plane in which the lever system swings is close to or substantially the same as the vertical plane of the leg 3, so that pressure by the foot of the operator on the pedal 24 will be exerted substantially within the area of the base of the device, and thereby stability is insured. The spring anchor pin 22 may serve as a stop for the pedal lever 23.

To facilitate shipment of these stands in bulk, and for the convenience of storage by the user between seasons of use, we have made the legs 1, 2 and 3 detachable. Preferably these legs are formed of round rod threaded at their upper ends and adapted to be threaded into threaded sockets 25. In the specific form shown these sockets are formed by threaded nuts welded to the ring 5, but this is merely a specific way of providing a threaded socket for the rods on the socket 4.

The method of use is obvious from the above. To condition the stand for the reception of the tree stem, the operator standing in position where he can conveniently step on the pedal 24 holds the tree in vertical position alongside the stand. Then he presses with his foot on the pedal 24 to open the jaws for the reception of the stem of the tree. The tree stem is then inserted between the jaw portions 11, 11 and entered into the tapered socket 4 which centers it and holds the lower end of the tree stem. The operator then holds the tree in vertical position and releases pressure on the pedal 24, whereupon the spring 20 swings the lever system in counter clockwise direction as viewed in Figure 1, and the shackle ring 15 strips along the rod portions 12, 12 advancing the crossing point of the rods towards the left as viewed in Figure 1, and closing the jaw portions 11, 11 against the sides of the tree stem at the distance above the socket provided by the bracket 8.

It is not strictly necessary that the shackle ring 15 and jaws 11, 11 be inherently self-locking, because the power of the spring 20 is available to resist displacement of the shackle ring 15 towards the right. Hence, as a practical matter, after the tree stem is once locked between the jaw portions 11, 11, it remains locked indefinitely against any of the usual forces which would operate on the tree.

The curvature of the jaw portions 11, 11 may be varied, but preferably is of a radius substantially equal to or slightly larger than the average size Christmas tree which the public is accustomed to buy. Trees with smaller stems will of course be gripped by the jaw portions 11, 11 closing further together.

If deemed necessary to adjust for an extreme variation, the flat body of the bracket 8 may be bent in one direction or the other, so as to secure the desired self-centering effect of the jaws in the vertical plane of the bracket. The stem of the tree is held at its extreme lower end in the tapered socket, and is held at a short distance above the same by the chuck jaws and such mounting of the tree is adequate for the usual purposes served by a Christmas tree.

In designating the chuck jaws as self-locking or substantially self-locking, we intend to cover the relation wherein the mechanical advantage of the means which holds the jaws together upon the stem of the tree is sufficient to prevent pressure applied to the jaws from relaxing the grip of the jaws within the limits of stability of the stand itself. In other words, if the tree be pushed sidewise accidentally, or otherwise, the pressure thus applied to the jaws will upset the stand before the jaws relax their grip.

We do not intend to be limited to the specific embodiment shown, nor to the deails of said specific embodiment except as the same are made an essential part of the appended claims.

We claim:

1. In a device of the class described, a base comprising legs and a central conical socket for centering a tree stem or the like, a bracket extending upwardly at one side of the socket, a pair of substantially horizontal arms pivoted on the upper end of the bracket, said arms having outwardly bowed jaw portions and integral convergent operating portions, a vertical arm pivoted at the side of the socket substantially opposite said bracket and being adapted to swing toward and away from the bracket, said arm having a shackle embracing said operating portions of the arms to hold them against separation.

2. In the device of claim 1, spring means anchored to the frame and connected to the arm and tending to move the arm in a direction to close the jaws, and a treadle lever to move said arm against the tension of the spring to open the jaws.

3. A Christmas tree holder comprising a stand having a socket, legs on the stand holding the socket in elevated position, a pair of arms pivoted on the stand and supported above the socket, said arms having convergent portions, an actuating shackle slidable along said convergent portions of the arms to hold the arms in gripping position upon and to release the arms from an article between them, and a lever connected to said shackle and pivotally mounted on the stand, said lever including a portion extending outward of the stand and being adapted for movement in a generally vertical stroke by the foot of a user for actuating said shackle.

4. A device of the class described, a supporting stand having a socket for receiving the lower end of the tree and legs holding the socket in elevated position, a bracket carried by the stand, and extending above the socket at one side thereof, a pair of clamping arms pivoted in the upper end of said bracket, said arms having facing jaws and crossing convergent portions, a lever pivoted on the stand and having a slidable shackle eye embracing the crossing point of said arms, whereby movement of said lever back and forth causes opening and closing of said jaws, and a spring connected between a stationary part of the stand and the lever for moving the lever in a direction to slide the shackle eye along the arms to cause them to close the jaws.

5. A device of the class described, comprising in combination a socket member for centering the stem of a Christmas tree, legs supporting said member, a vertically extending bracket at one side of the socket member, a pair of substantially horizontally disposed arms pivoted to said bracket, said arms having facing jaw portions disposed over the socket member and having convergent portions extending beyond the socket member, a lever pivoted on the side of the socket member opposite the bracket and having at its upper end a shackle member for engaging the convergent portions of said arms to hold the jaws against the stem of said tree, and means for actuating the lever to slide said shackle along said convergent portions.

6. A device of the class described, comprising the combination of a downwardly and inwardly convergent socket member, a plurality of divergent legs connected to the socket member, a bracket attached to one side of the socket member and extending upwardly, a pair of substantially horizontally disposed arms adapted to swing in substantially a horizontal plane pivoted on the upper end of said bracket, said arms having jaw portions above the socket and convergent portions extending away from the bracket, a lever pivoted on the side of the socket member opposite said bracket and swinging in substantially a vertical plane, said lever having an upwardly extending arm and carrying a shackle slidable on said convergent portions of said arms and holding them together with the jaws centered over the socket member, a downwardly extending arm, a spring connecting said latter arm to a stationary part of the device and tensioned to move the lever in a direction to move the jaw portions together.

7. The device of claim 6 wherein said lever has a generally horizontally extending treadle arm to be depressed to move the lever in a direction to open said jaws against the tension of said spring.

8. In combination with a base having a conical socket for receiving and centering the end of a tree stem, a plurality of pivoted jaw members carried on said base, said members having converging operating rods adapted to cross each other, a shackle member embracing the rods at the point of crossing, a pedal lever for moving said shackle to open the jaws, and spring means connected to the lever for moving the shackle to close the jaws.

9. In a Christmas tree stand, a base having means for receiving and supporting the lower end of the tree stem, and a chuck having substantially self-centering jaws for embracing and holding the stem above said supporting means, operating means for actuating said jaws in unison to open or to close the same, a pivotal treadle connected to said operating means, a spring between said base and said operating means tending at all times to move said operating means to close the jaws, said treadle including a portion extending outwardly of said base and adapted for movement downwardly by the foot of the operator to move the operating means to separate the jaws against the tension of the spring.

10. In a Christmas tree holder, a base comprising a socket for centering a tree stem, a pair of generally horizontally extending arms pivotally supported on said base above said socket for movement in a generally horizontal plane, said arms including opposed jaw portions disposed to opposite sides of said socket and adapted for the reception therebetween of the tree stem, said arms including converging portions to one side of said socket, and locking means operatively associated with said converging portions of said arms for holding said jaw portions of said arms against the tree stem.

JOHN C. KASS.
THEODORE C. KASS.

REFERENCES CITED

The following references are of record in the file of this patent:

UNITED STATES PATENTS

| Number | Name | Date |
|---|---|---|
| 224,624 | Albrecht | Feb. 17, 1880 |
| 328,007 | Coffin | Oct. 13, 1885 |
| 364,978 | Vintree | June 14, 1887 |
| 687,902 | Rossmann | Dec. 3, 1901 |
| 1,233,207 | Elbe | July 10, 1917 |
| 1,733,011 | Healy | Oct. 22, 1929 |
| 2,459,533 | Irvin | Jan. 18, 1949 |
| 2,478,278 | Kiesow | Aug. 9, 1949 |
| 2,485,233 | Cima | Oct. 18, 1949 |

FOREIGN PATENTS

| Number | Country | Date |
|---|---|---|
| 545,486 | Great Britain | of 1942 |